United States Patent
Banerjee et al.

(10) Patent No.: US 9,501,493 B1
(45) Date of Patent: Nov. 22, 2016

(54) INSTANTIATING VIRTUALIZATION UNIT ON STORAGE OR PROXY NODE FOR PERFORMING OPERATION BASED ON NODE HAVING HARDWARE CHARACTERISTICS FOR SERVING REQUIRED FILE SYSTEM ROLE FOR OPERATION

(71) Applicant: International Business Machines Corporation, Armonk, NY (US)

(72) Inventors: Pradipta K. Banerjee, Bangalore (IN); Sasikanth Eda, Vijayawada (IN); Deepak R. Ghuge, Sangamner (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/959,769

(22) Filed: Dec. 4, 2015

(51) Int. Cl.
*G06F 17/30* (2006.01)
*G06F 9/50* (2006.01)
*G06F 9/48* (2006.01)

(52) U.S. Cl.
CPC ....... *G06F 17/30194* (2013.01); *G06F 9/4881* (2013.01); *G06F 17/3007* (2013.01); *G06F 9/5005* (2013.01); *G06F 9/5044* (2013.01)

(58) Field of Classification Search
None
See application file for complete search history.

(56) References Cited

U.S. PATENT DOCUMENTS

| 8,209,702 | B1 | 6/2012 | Roytman et al. |
| 9,015,724 | B2 | 4/2015 | Druyan |
| 2006/0026161 | A1 | 2/2006 | Henseler |
| 2007/0156669 | A1* | 7/2007 | Marchisio ......... G06F 17/30731 |
| 2008/0137830 | A1* | 6/2008 | Bhogal ................ H04L 67/327 379/201.04 |
| 2009/0030896 | A1* | 1/2009 | Jensen ............. G06F 17/30545 |
| 2009/0100158 | A1* | 4/2009 | Sonkin ............... H04L 41/0856 709/221 |
| 2009/0293022 | A1 | 11/2009 | Fries |
| 2012/0185867 | A1 | 7/2012 | Archer et al. |
| 2013/0166677 | A1 | 6/2013 | Chung et al. |
| 2013/0275122 | A1* | 10/2013 | Park ....................... G06F 17/28 704/9 |
| 2013/0346615 | A1 | 12/2013 | Gondi |
| 2014/0047342 | A1 | 2/2014 | Breternitz et al. |
| 2014/0189130 | A1 | 7/2014 | Khandelwal et al. |
| 2015/0106398 | A1* | 4/2015 | Tomlinson ........ G06F 17/30259 707/769 |
| 2015/0235044 | A1* | 8/2015 | Cohen ................. G06F 21/6218 726/17 |
| 2016/0048413 | A1* | 2/2016 | Matsuyama .......... G06F 9/5005 718/104 |

OTHER PUBLICATIONS

S. V. Gogouvitis; Vision Cloud: A Cloud Storage Solution Supporting Modern Media Production; SMPTE Motion Imaging Journal 2013; pp. 30-37.*

(Continued)

*Primary Examiner* — Abdullah Al Kawsar
(74) *Attorney, Agent, or Firm* — Stosch Sabo

(57) ABSTRACT

A method for adjusting roles of nodes in a distributed clustered file system can include receiving a first computation operation and profiling the first computation operation according to one or more metrics. The method can also include determining, based on the profiling of the first computation operation, a first file system attribute of the first computation operation. The method can also include identifying that the first computation operation serves a first file system role and identifying a first hardware characteristic of hardware on which a first node of a plurality of nodes is hosted. The method can also include receiving an identification that the first node can utilize additional computation of the first file system role and instantiating a virtualization unit on the first node.

14 Claims, 7 Drawing Sheets

(56) References Cited

OTHER PUBLICATIONS

Burt, J., "IBM Looking to 'Storlets' to Manage Object Storage," eweek.com, May 15, 2014 (printed Aug. 28, 2015), 1 page, eweek.com/storage/ibm-looking-to-storlets-to-manage-object-storage.html.

Rabinovici-Cohen et al., "Storlet Engine: Performing Computations in Cloud Storage," IBM Research Report, H-0320 (HAI1408-001), Aug. 4, 2014, pp. 1-13.

Rabinovici-Cohen et al., "Storlet Engine: Performing Computations in Cloud Storage", IBM Research Report, H-0320 (HAI408-001) Aug. 4, 2014, Computer Science. Haifa, Israel. 13 pages.

Banerjee et al., "Storlet Workflow Optimization Leveraging Clustered File System Roles", U.S. Appl. No. 14/959,733, filed Dec. 4, 2015.

List of IBM Patents or Patent Applications Treated as Related, Apr. 22, 2016. 2 pages.

* cited by examiner

| COMPUTATION OPERATION | FILE SYSTEM ROLE REQUIRED | CURRENT NODE SERVING THIS ROLE |
|---|---|---|
| IMAGE PROCESSING | TOKEN | STORAGE_NODE8 |
| ARCHIVE / BACKUP | REPLICATOR | PROXY_NODE11 |
| REAL TIME / GAMING | WAN CACHING | STORAGE_NODE6 |
| LONGER EXECUTION | REDUNDANT / QUORUM | STORAGE_NODE20 |
| METADATA | METADATA MANAGER | PROXY_NODE8 |

FIG. 3

INSTANTIATING VIRTUALIZATION UNIT ON STORAGE OR PROXY NODE FOR PERFORMING OPERATION BASED ON NODE HAVING HARDWARE CHARACTERISTICS FOR SERVING REQUIRED FILE SYSTEM ROLE FOR OPERATION

BACKGROUND

Aspects of the present disclosure relate to computing in an object storage environment, and more particular aspects relate to optimizing computing infrastructure within an object storage environment.

In object-based storage, various shortcomings may limit performance. In some cases, excessive communication between storage nodes has impaired performance. In other cases, performance of nodes has been limited by an inefficient usage of hardware resources.

SUMMARY

According to embodiments of the present disclosure, a method, system, and computer program product are disclosed for adjusting roles of nodes in a distributed clustered file system. The method (or the system or computer program product) can include receiving a first computation operation. The method can also include profiling the first computation operation according to one or more metrics. The method can also include determining, based on the profiling of the first computation operation, a first file system attribute of the first computation operation. The method can also include identifying, in response to determining the first file system attribute, that the first computation operation serves a first file system role. The method can also include identifying a first hardware characteristic of hardware on which a first node of a plurality of nodes is hosted. The method can also include receiving an identification, in response to the performing the lookup, that the first node can utilize additional computation of the first file system role. The method can also include instantiating a virtualization unit on the first node, where the first node is selected based on the first file system attribute and the first hardware characteristic, and where the virtualization unit serves the first file system role that can utilize the additional computation of the virtualization unit.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 depicts a template for assigning roles to nodes, according to various embodiments.

Figure 1:
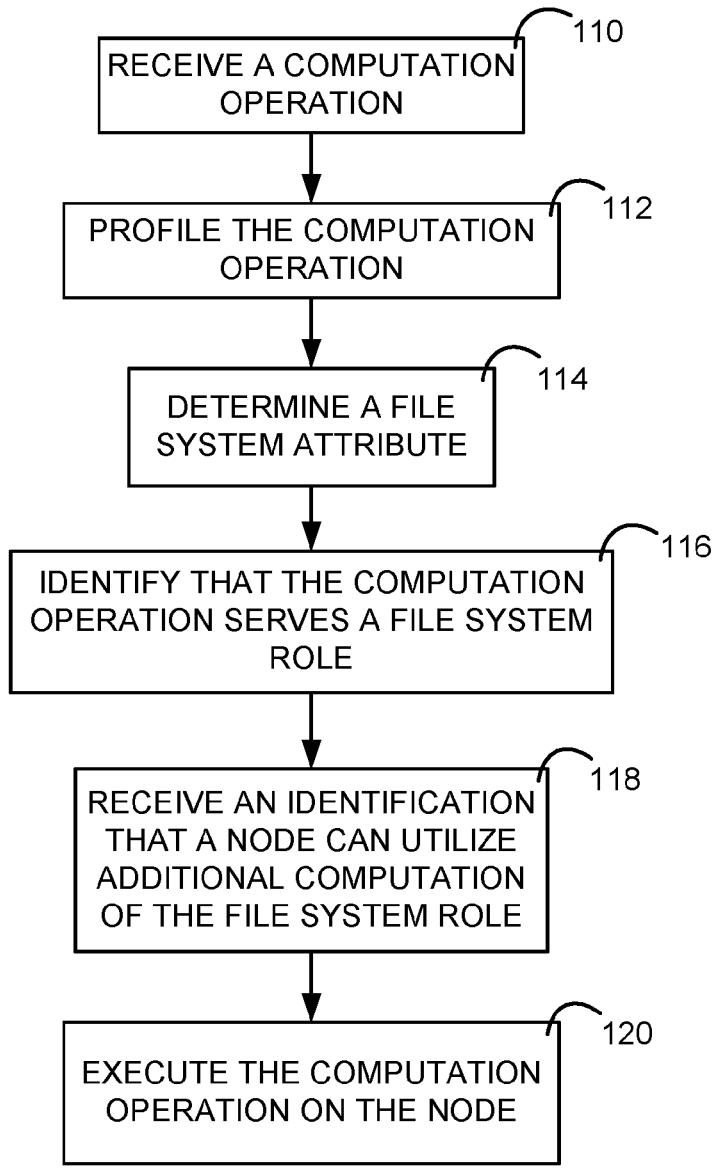
FIG. 1 depicts a flowchart for workflow optimization based on computation operation roles and node characteristics, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computing in an object storage environment, and more particular aspects relate to optimizing computing infrastructure within an object storage environment.

In order to combat various inefficiencies, a storlet engine may be utilized in an object storage environment, and the storlet engine may utilize one or more storlets. A storlet may be a computation module that may be uploaded dynamically, e.g., the storlet may be transferred to a storage node from another node without interrupting an ongoing process. A storlet may include embedded computing infrastructure within an object storage environment. A storlet may also serve to offload data-intensive computations to where data is stored, instead of data being processed in a single location. A storlet may run within a storage unit or medium, proximate to various data. A storlet may be executed in a sandbox when not trusted, according to various embodiments. A storlet may be viewed as an analog to stored procedures in databases. A storlet may add flexibility to the storage, and may make the storage extensible, effectively making the storage a platform, according to various embodiments. In other words, a storage may be transformed using a storlet from merely keeping data, to producing value from the data. A storlet engine may run one or more storlets, according to various embodiments, and may operate along with various software (e.g., middleware).

The architecture of a storlet may include a software engine within various nodes. An end user may frame the computation operation and deploy or pass it to the engine as a typical object storage request (e.g., "PUT") operation. A storlet-configured object storage may not require any additional client or a compute node to perform analysis of the data, thus the storage or proxy nodes may act as compute nodes and may return results to the user. Various architectures may use virtual machines (VMs), but the architectures may also or instead use Linux containers, Dockers, etc. deployed on the nodes in order to perform various computation tasks or operations. A storlet may be composed of or utilize Linux containers and/or additional middleware.

A workflow of a storlet engine may be optimized by leveraging various file system roles, and may be distributed across various nodes in a distributed clustered file system, according to various embodiments. Alternatively, various algorithms, operations, or frameworks may help to optimize a workflow of a storlet by leveraging various underlying hardware features.

An example object storage architecture may utilize two types of nodes (also referred to as entities). One node type called "proxy" nodes may be used for distributed load handling and request handling nodes into a namespace. Another node type may be called "storage" nodes, which may write to the various storage subsystems (e.g., disks). Storage nodes may serve as a storage unit or repository, and may assist in analysis, including extracting information from raw data of the data residing in these storage subsystems. Traditionally the architecture would utilize an additional client or node in order to compute data.

In a clustered file system (e.g., IBM GPFS), there may be one or more nodes that provide tokens to the rest of a cluster, these nodes are called Token Managers. In programming languages, a token may be a single element of a programming language. For example, a token could be a keyword, an operator, or a punctuation mark. For example, in networking, a token may be a particular series of bits that travels around a token-ring network. As the token circulates, computers attached to the network can capture it. In this sense, a token may act as a ticket, enabling an owner to send a message across the network. There may be only one token for each network, so there would be no possibility that two computers will attempt to transmit messages at the same time.

Token Managers may be selected from nodes previously designated as managers. The Token Managers may be responsible for tracking all of the tokens in the cluster, but these nodes may or may not maintain file metadata, a job that may be performed by a meta node.

Within a clustered file system, a cluster with one or more cache file-sets may utilize a gateway node (which may act as a network file system (NFS) client to fetch data in parallel from home) and may have multiple application nodes (which may service application data requests). On the application nodes, data requests may be handled locally if the requested data is cached. Otherwise, the data requests may be forwarded on to gateway nodes, which may use an NFS client to handle the request.

A split between application and gateway nodes may be conceptual, and any node in the cache cluster may function as either a gateway node or an application node based on its configuration, according to various embodiments. Gateway nodes may be viewed as the edge of the cache cluster that may communicate with a home cluster, while the application nodes may interface with the application. Application nodes may communicate with each other via internal remote procedure call (RPC) requests. Active file management (AFM) may be supported on AIX® and Linux nodes, which may be assigned as gateway nodes.

Client nodes may permit or facilitate an exchange of data between virtual servers that locally mount a clustered file system. Virtual servers may include or encompass various VMs and/or containers or other virtualization units. Other exports of the data may or may not be permitted, according to various embodiments. The client node may or may not be used for virtual servers to share clustered file system data directly through any application, service, protocol or method, such as NFS, common internet file system (CMS), file transfer protocol (FTP), or hypertext transfer protocol (HTTP). For various functions, a clustered file system server license may be required or requested, according to various embodiments.

An administration (admin) node may be used by various administration commands to communicate between nodes. A metadata node may be a node that handles metadata, also referred to as "directory block updates." An application node may mount a clustered file system and may run an application (e.g., of a user), which may access the file system.

Clustered file systems (e.g., GlusterFS, Ceph, GPFS, etc.) may use a cluster mechanism, such as quorum, to maintain data consistency in the event of a node failure. During node failure situations, quorum may need to be maintained in order for the cluster to remain online. If quorum is not maintained due to node failure, the clustered file system may unmount local file systems from the remaining nodes and may attempt to reestablish quorum, at which point a file system recovery may occur. Replication servers in a file system organization, through various migration techniques, may be used to synchronize folders for servers on network connections that have a limited bandwidth, according to various embodiments. According to various embodiments, VMware templates may be used. A policy execution server may include a node that handles execution of automated information lifecycle management (ILM) policies defined or deployed for the cluster or namespace.

A storlet scheduler operation or framework may improve computation performance and may reduce workload on a storage unit in a multi-node object storage environment by performing specific workflow changes in the embedded compute engine. This may help in automatic storlet invocation (which may include selecting a node for computation operation execution), according to a classification of computation operations designated for a particular system. An appropriate node may be determined based on a file system role performed by a node or server in the back-end of a clustered file system.

Object storage systems (both traditional object storage and embedded compute engines within object storage systems) may be built using commodity or multi-vendor hardware. Each node may be treated equally irrespective of its roles. The usage of commodity hardware for traditional object storage systems may be practical as the object storage may be primarily designed to be a low cost storage, but the commodity or multi-vendor hardware when used for compute embedded object storage system may generate suboptimal results.

A storlet scheduler operation or framework may improve computation performance or may reduce workload on the storage unit in a multi-vendor commodity object storage environment by performing specific workflow changes in the embedded compute engine (storlet). Workflow changes may be made according to various hardware architecture values or characteristics. Hardware characteristics may be designated by default by the hardware manufacturer, or may be received from any other source, including various repositories on the Internet and elsewhere.

In a storage context, clustered file systems may be used as a back-end storage for object storage (as opposed to using ext3, ext4, XFS, etc.). Various examples, when utilized in conjunction, may join various advantages (e.g., backup, replication, consistency, locking, better metadata handling, etc.) of a clustered file system to object storage architectures. However, various issues may exist when a clustered file system backed object storage is used for storlet execution. Various issues may include excessive communication (through, e.g., transfer control protocol (TCP) or remote program call (RPC)) between various nodes, or excessive interlocking between the nodes. The interlocking may occur because of attempts to maintain consistency.

A clustered file system may include multiple nodes across a network and according to the distributed nature of its architecture, and some of the nodes participating in the cluster may need to perform additional roles or functions (e.g., admin node, application node, client node, metadata node, token manager node, WAN caching gateway node, quorum node, etc., as outlined herein). By virtue of the roles performed by the node, some computation operations performed on these nodes may prove to be faster, as opposed to executing computation operations inefficiently with in view of roles performed by the node.

If a user inputs a computation operation, execution of the operation may involve repetitive operations on each object, such as image processing, where each object may need to read/write multiple times at each pass. The computation operation may also generate substantial token traffic (e.g., each time the container starts accessing the object, the node may pass the request to the token manager node to verify whether this object is locked by any other application). In the aforementioned scenario a storlet invocation may be made on a node other than a token manager node. As a result, excessive communication (RPC calls) may occur between the node that is used for executing the storlet computation operation and the node that handles token management.

A storlet architecture may lack intelligence to select the node for fulfilling a specific type of computation operation, by which the storage unit may be benefited by the file system role performed by the selected node. Lack of intelligence may result in a substantial increase in disk input/output (I/O) operations, and load on the file system, and may result in degradation of storage unit performance, which may reduce the life span of disks involved.

A framework and middleware may help in efficient storlet invocation. Invocation may include picking a node for a computation operation execution according to the classification of computation operations meant for a particular system. The appropriate node may be determined based on the file system role performed by node or server in a clustered file system back-end.

Object storage units used for scaling out may be built using commodity hardware, and may be initially deployed on multi-vendor hardware. Various hardware types, old or new, may be dynamically plugged in (or unplugged) as demand grows or shrinks. Sometimes the object storage units may be initially deployed using multi-vendor hardware platforms in order to reduce capital expenditures (CAPEX).

FIG. 1 depicts a flowchart 100 for workflow optimization based on computation operation roles and node characteristics, according to various embodiments.

At 110, optimizing workflow begins by receiving a first computation operation. At 112, the received computation operation may be profiled according to one or more metrics. The profiling may include identifying and categorizing a first process performed by the first computation operation. The profiling the first computation operation according to one or more metrics may also include parsing the first computation operation into a plurality of sub-operations, and analyzing the plurality of sub-operations together or separately. Identifying and categorizing the first process performed by the first computation operation may utilize a daemon, according to various embodiments.

At 114, a first file system attribute of the first computation operation may be determined. The first file system attribute may include node type, features, file system roles, computation operation categories, and/or tasks served by a first node. The first file system attribute may be determined based on past performance, or metadata of the first computation operation, according to various embodiments. The first file system attribute may further be based on a file system role of the first computation operation, according to various embodiments.

At 116, a lookup operation may be performed based on a first computation template, and it may be identified that the first computation operation serves a first file system role. The first computation template may be configurable by a user, according to various embodiments.

At 118, an identification that a first node can utilize additional computation of the first file system role may be received. The first node may be a proxy node, storage node, or other type of node, according to various embodiments. A storage node may be utilized as a storage medium within a virtualization environment. Proxy nodes may be utilized to communicate data or bits between storage nodes and other nodes. At 120, the first computation operation may be executed on the first node. According to various embodiments, the first node may be selected based on the first file system attribute, and the first node may serve the first file system role that can utilize additional computation.

According to various embodiments, at a first time interval, a second computation operation may be received. The second computation operation may then be profiled according to one or more metrics, which may include, for example, identifying and categorizing a second process performed by the second computation operation. A second file system attribute may then be determined, based on the profiling of the second computation operation, of the second computation operation.

An example of a storlet engine workflow may include various steps, according to various embodiments. A user may deploy a computation operation (e.g., a PUT operation). The storlet engine may then parse the computation operation for syntax errors. The storlet engine may then determine the type, nature, and/or characteristics of the computation operation. For example, the computation operation may be arithmetic, or any specialized operation, such as conversion from .TXT to .PDF, editing .JPG, etc. The storlet engine may then determine a node to be used for instantiating a virtualization unit. The storlet engine may then pass the computation operation to the virtualization unit. The virtualization unit may then pull, read, or write data, based on the steps defined in the computation operation. The storlet may then return to the user code, which may indicate a success or failure, and/or results.

A middleware software engine may be integrated with a storlet architecture in order to leverage or designate various file system roles, in order to distribute roles across various nodes in a distributed clustered file system.

A storlet engine may estimate a file system role appropriate for a deployed computation operation. This estimation may be based on the type of the operations encapsulated in the computation operation. This estimation may also be auto learning enabled, and an end user may have the ability to determine the role required, via metadata or an extended attribute of the computation operation object. The storlet engine may also enable a periodic framework, which may scan for underlying file system features, roles, and/or tasks served by each node. These collected details per node participating in the object storage cluster may be reported to a scheduler service embedded with the storlet engine.

Based on the identified file system role suited for the computation operation and file systems reported to the scheduler service, the storlet engine may perform a lookup operation against a pre-programmed template, which may be updated dynamically, automatically, and/or by an administrator. If the appropriate file system role is found available among the reported nodes and based on available resources, the storlet engine may determine a node to be used for executing this particular computation operation.

Figure 2:
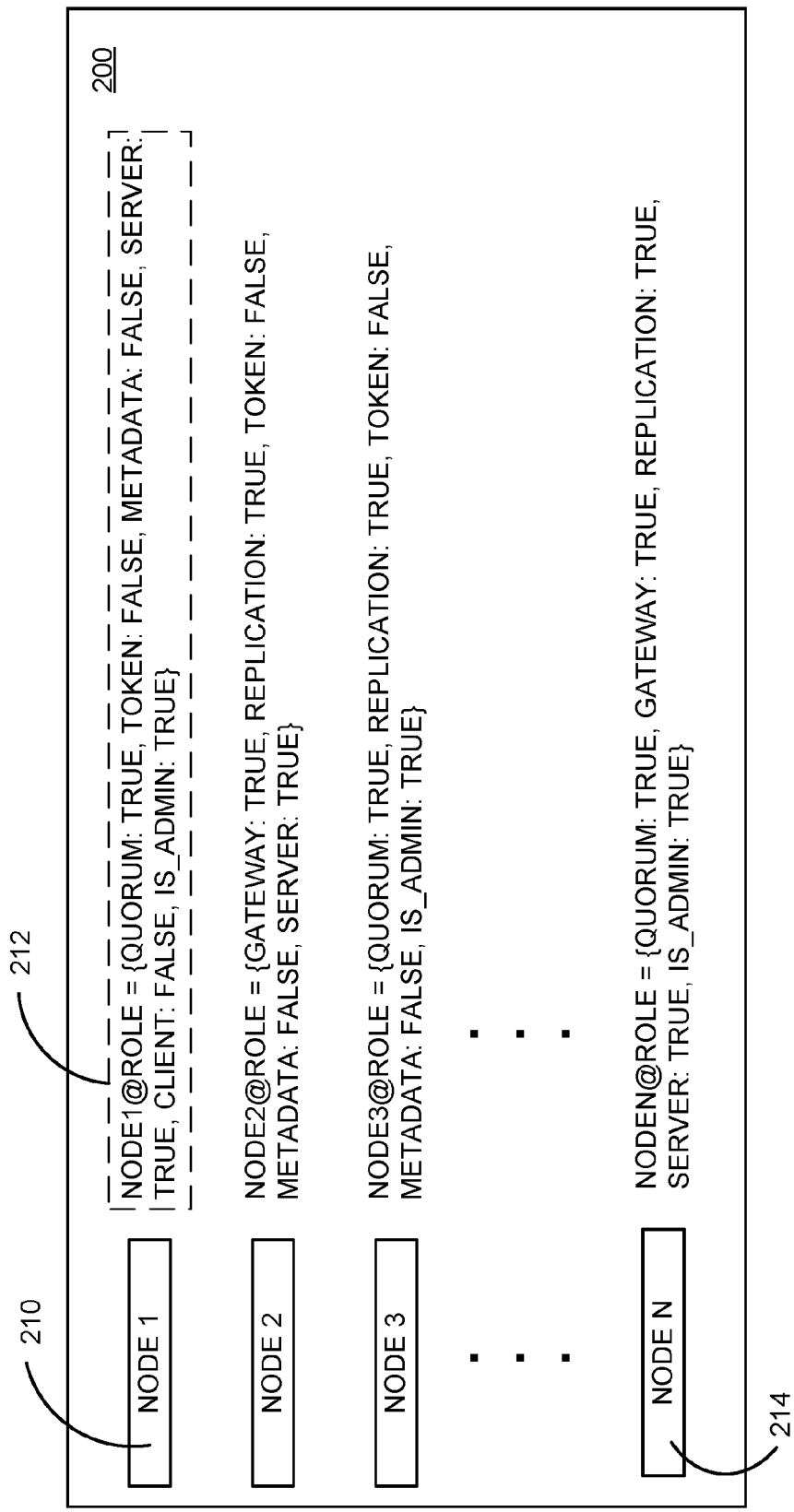
FIG. 2 depicts a table containing characteristics of nodes, according to various embodiments.

FIG. 2 depicts a table 200 containing characteristics of nodes, according to various embodiments.

A scheduler framework may collect and/or compile underlying file system features, roles, and/or tasks served by each node, as depicted in table 200. Various nodes may be shown, such as node 1 at 210. Features, roles, and/or tasks may be displayed or stored at 212. Respective information may be appended or included for any number of nodes, up to an N$^{th}$ node 214. Each node may have information akin to the representation at 212.

A proposed framework may facilitate a daemon on each node participating in the object storage cluster and the daemon may collect the file system features, roles, and/or tasks served by each node, and may export the collected details from each node to the storlet scheduler (proposed middleware). The storlet engine may then use the details to identify the underlying file system roles served by the node (e.g., proxy or storage nodes).

Middleware may enable a hook in the storlet engine execution cycle and facilitate a provision to auto determine a suitable file system role required of the computation operation deployed by the user. It may also support manual determination of the file system role required for the computation operation (auto learning platform).

An example of file system role determination of a deployed computation operation by the proposed middleware may include, for example, (Image processing)→Token manager; (Achieve/Backup operations)→replication manager; (Long running operations)→Quorum manager; (Gaming/real time operations)→WAN caching gateway; or (Metadata operations)→Metadata manager, according to various embodiments.

The middleware may keep track of the file system role performed by the node and the deployed computation operation category. Based on these parameters, the middleware may help the storlet engine to determine the appropriate node to be selected for processing the deployed computation operation along with the available resource consideration. It may form a standard comparison of the determined computation operation file system role needed versus the best matched node role which are pre-programmed and inputted to the storlet engine as a template, according to various embodiments.

FIG. 3 depicts a template 300 for assigning roles to nodes, according to various embodiments.

The example template 300 may include various categories, such as computation operation 310, file system role required 312, and current node serving this role 314. Template 300 may be the template used at 116, according to various embodiments. At 316 may be input and output data related to each category, including attributes or characteristics of operations and/or nodes, and details of each operation and/or node, as described herein.

Figure 4:
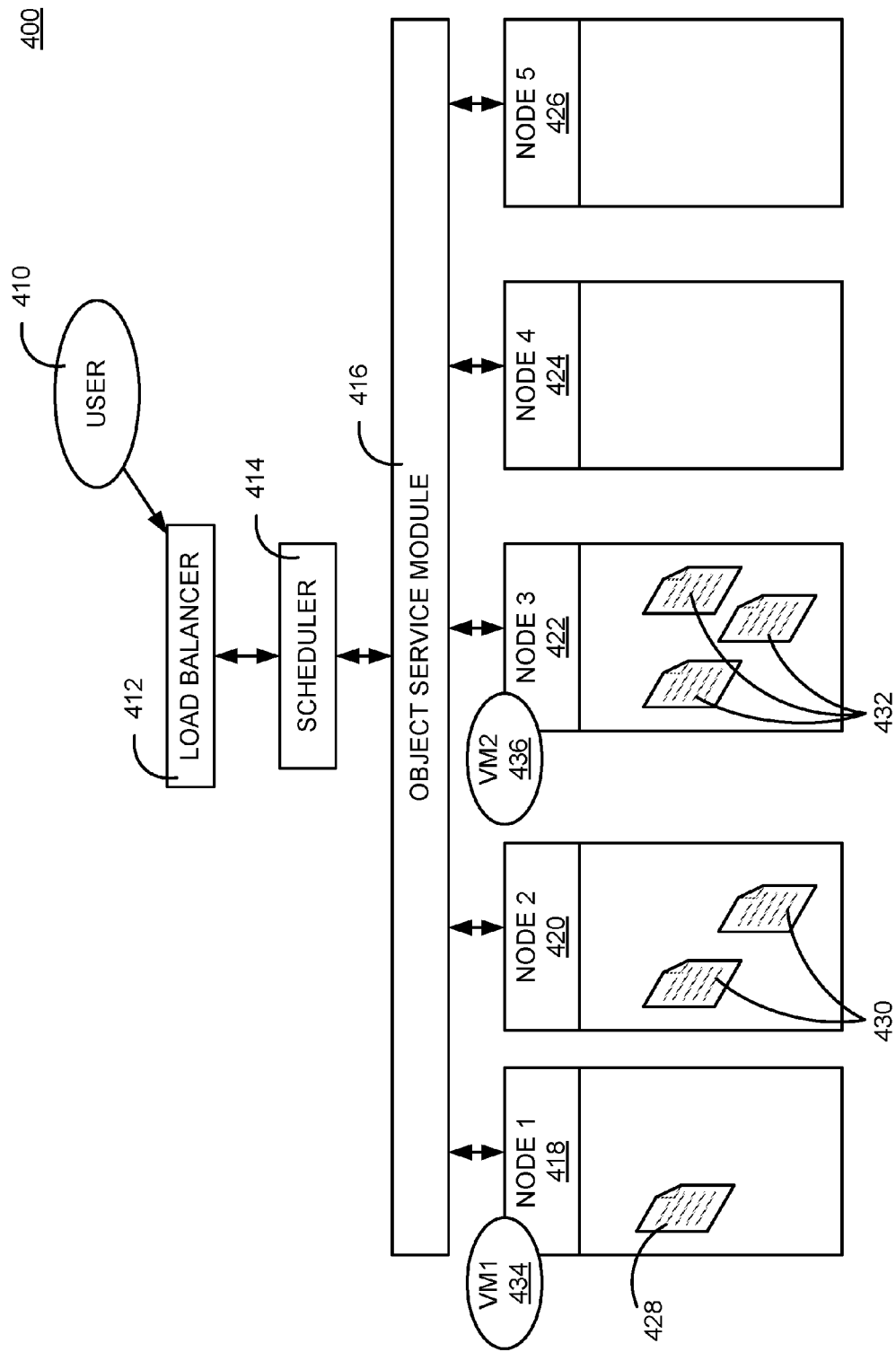
FIG. 4 depicts a block diagram for assigning virtual machines to nodes based on workload, according to various embodiments.

FIG. 4 depicts a block diagram 400 for assigning virtual machines to nodes based on workload, according to various embodiments.

At 412, a load balancer is shown, which may receive input from a user 410. The load balancer 412 may communicate with a storlet scheduler module 414. The load balancer may balance workloads across various nodes such that each node is less likely to be over-utilized or underutilized, according to various embodiments. The storlet scheduler module 414 is shown where the node for storlet invocation is determined based on the computation operations and the file system role served by the node, which may reduce unnecessary communication between nodes and reduces load on the storage unit.

The scheduler module may communication with an object service module 416. The object service module may communicate or assign VMs or operations to nodes, including node 1 418, node 2 420, node 3 422, node 4 424, and node 5 426, according to various embodiments. Various VMs, including VM1, VM2, etc. may be assigned to various nodes, as described herein. Various data or operations may be stored on various nodes, e.g., a storage node. Various operations may be executed on various nodes, e.g., using a VM.

According to the shown embodiment, data 428 is stored on node 1 418, along with VM1 434. Data 430 is stored on node 2 420. Data 432 is stored on node 3 422, along with VM2 436. Nodes 4 and 5 (424 and 426, respectively) contain neither data nor VMs.

Various computation operations may be stored as data, and may be assigned to various nodes, as described herein. Various nodes may be assigned VMs by the object service module 416, according to various embodiments.

Figure 5:
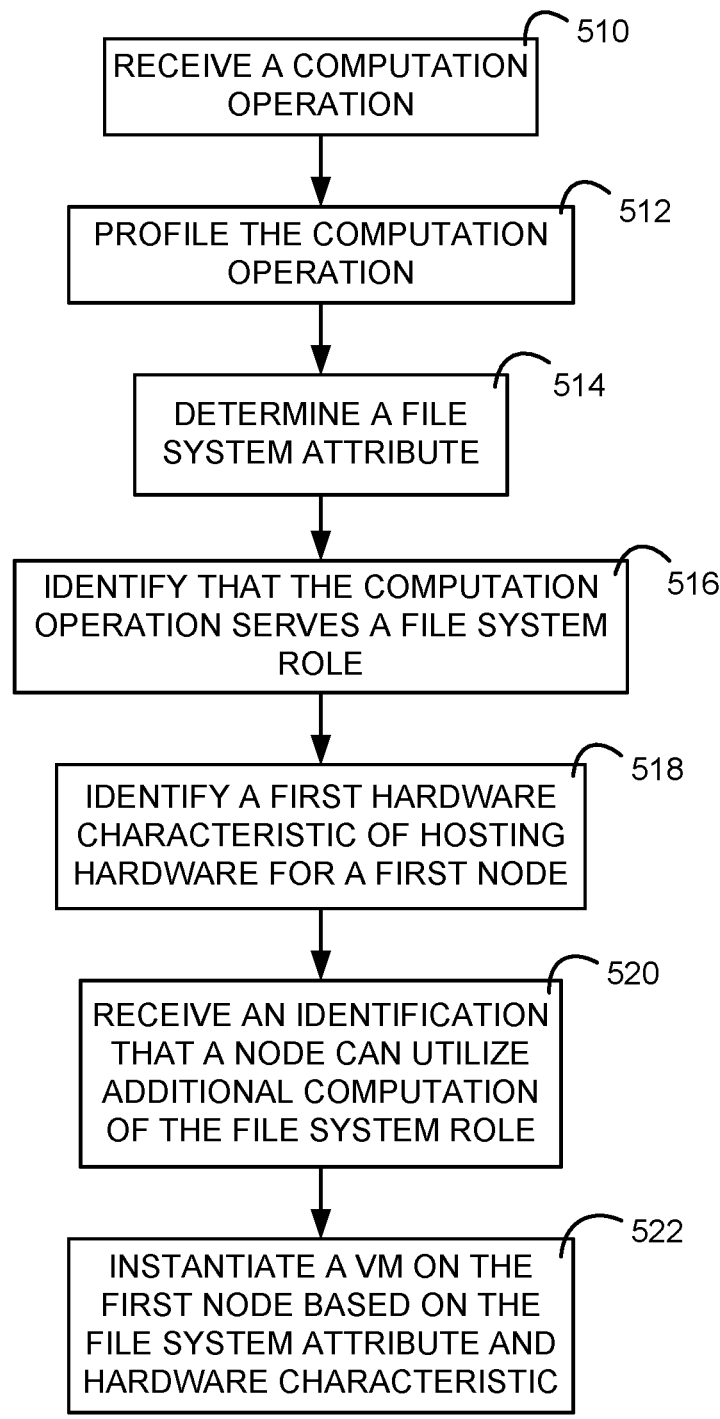
FIG. 5 depicts a flowchart for workflow optimization based on hardware characteristics, according to various embodiments.

FIG. 5 depicts a flowchart 500 for workflow optimization based on hardware characteristics, according to various embodiments.

At 510, a first computation operation may be received. At 512, the first computation operation may be profiled according to one or more metrics. Profiling the first computation operation according to one or more metrics may include parsing the first computation operation into a plurality of sub-operations, and analyzing the plurality of sub-operations. The profiling of the first computation operation may utilize a daemon, according to various embodiments.

At 514, a first file system attribute of the first computation operation may be determined based on the profiling of the first computation operation. According to various embodiments, the first file system attribute may include or be related to node type, features, file system roles, computation operation categories, or tasks served by the first node. The first file system attribute may be determined based on past performance, according to various embodiments. The first file system attribute may be determined based on metadata of the first computation operation. The first file system attribute may also be determined based on a file system role of the first computation operation, according to various embodiments.

At 516, it may be identified that the first computation operation serves a first file system role. The identifying that the first computation operation serves a first file system role 516 may perform a lookup operation based on a first computation operation template, according to various embodiments. The first computation template may be configurable by a user, according to various embodiments.

At 518, a first hardware characteristic of hardware may be identified, on which a first node of a plurality of nodes may be hosted. The first node may be a proxy node or a storage node, according to various embodiments. The first hardware characteristic may include various characteristics, including hardware role, number of processing cores, hard disk speed, thermal characteristics, hardware efficiency, hyper-transport status, proxy status, etc.

At 520, an identification that a first node can utilize additional computation of the file system role may be received. At 522, a virtualization unit (e.g., a VM) may be instantiated on the first node. The first node may be selected based on the first file system attribute and/or the first hardware characteristic, according to various embodiments. The virtualization unit may serve the first file system role that can utilize the additional computation of the virtualization unit.

According to various embodiments, a second computation operation may be received. The second computation operation may then be profiled according to one or more metrics. Based on the profiling of the second computation operation, a second file system attribute of the second computation operation may be determined, according to various embodiments.

A storlet engine may treat each node participating in the object storage cluster equally, irrespective of the hardware type, model, manufacturer, etc. of the node. The storlet engine may identify the nodes as unique nodes using respective network addresses (e.g., IP addresses). A storlet engine execution step used to determine or identify a node to be used for instantiating a virtualization unit, and passing the computation operation to the virtualization unit may be achieved in various ways. One way may include instantiating the virtualization unit on the node that contains maximum data required for fulfilling that particular computation operation. Another way may include instantiating the virtualization unit on the node that contains maximum available hardware resources. However, the above-mentioned techniques may prove to be inefficient in the case of multi-vendor or varied hardware, as even hardware with maximum available resources may or may not be the most efficient choice for running or hosting a particular node.

A storlet engine may be deployed within object storage units, which may help in preparing the hardware resources to be computation ready, possibly including a virtualization unit (e.g., a Linux container, Docker, ZeroVM, etc.) and middleware (e.g., software units), which may help determine a computation operation to be performed by the virtualization unit. The determining may be based on a user-deployed computation operation.

If an object storage cluster is built using multi-vendor hardware units (e.g., nodes 1, 2, and 3 are Intel, nodes 4, 5, and 6 are Supermicro, and nodes 7, 8, and 9 are IBM OpenPower). These nodes may contain different hardware built-in features, which may help them process efficiently with respect to certain workloads. For example, the Intel nodes may contain specialized hardware accelerators that make them process encryption workloads efficiently. Likewise, the Supermicro nodes may contain a special application-specific integrated chip (ASIC) that makes them process image and video rendering workloads efficiently. Finally, according to this example, the IBM OpenPower nodes may contain special central processing unit (CPU) architecture that makes them process arithmetic operations efficiently, such as seismic, cosmic data processing etc.

If a computation operation has been deployed, which falls under the category of arithmetic operations, and both the example IBM OpenPower node, and Intel node reported a similar hardware resource availability, a storlet engine may treat both nodes as equal, and it may assign to the Intel node the handling of this computation operation. The assignment to the Intel node, possibly not optimal for such an operation, may in turn result in undesirable performance, possibly in terms of increased time for processing and increased load on a storage unit. If instead the example IBM OpenPower node has been assigned this workload, it possibly could have delivered better results than other nodes, like the Intel node.

A lack of a framework and/or middleware may help an example storlet engine to understand the underlying hardware features built by the manufacturers, and may cause a selection of nodes or hardware based on the workloads (e.g., computation operation input) that could be accelerated by various hardware platforms available for use by the storlet engine.

Other embodiments may provision a framework and/or middleware that can be integrated with the storlet architecture to help determine or select an appropriate node to be used for executing a specified computation workload. The selection may be based on the type of computation operations involved in the request and file system role or task performed by the node, or based on the hardware features or attributes built in to the nodes by hardware manufacturers.

Implementation of a middleware software engine that can be integrated with the storlet architecture helps leverage the underlying hardware features built by the hardware manufacturers. For example, various middleware may estimate category of the deployed computation operation. This estimation may be based on the type of the operations encapsulated in the computation operation. This estimation may be auto learning enabled and an end user may determine the category via metadata or an extended attribute of the computation operation object.

Proposed middleware may also enable a periodic framework that scans for underlying hardware features, disk speed variations, and roles served by the node. These collected details per node participating in the object storage cluster are reported to the scheduler service embedded with the storlet engine. Based on the computation operation category and features reported to the scheduler service, middleware (or a storlet engine) may perform a lookup operation using a pre-programmed template. The template may contain a map of category versus hardware features for the feature required for a particular computation operation category. The template may be similar to template 300 shown in FIG. 3, except hardware features may be featured in the template.

If the appropriate feature is found available among the reported nodes and based on its available resources, the storlet engine may determine a node to be used for executing this particular computation operation is modified such that the node bearing this hardware feature is selected for instantiating the virtualization unit.

Figure 6:
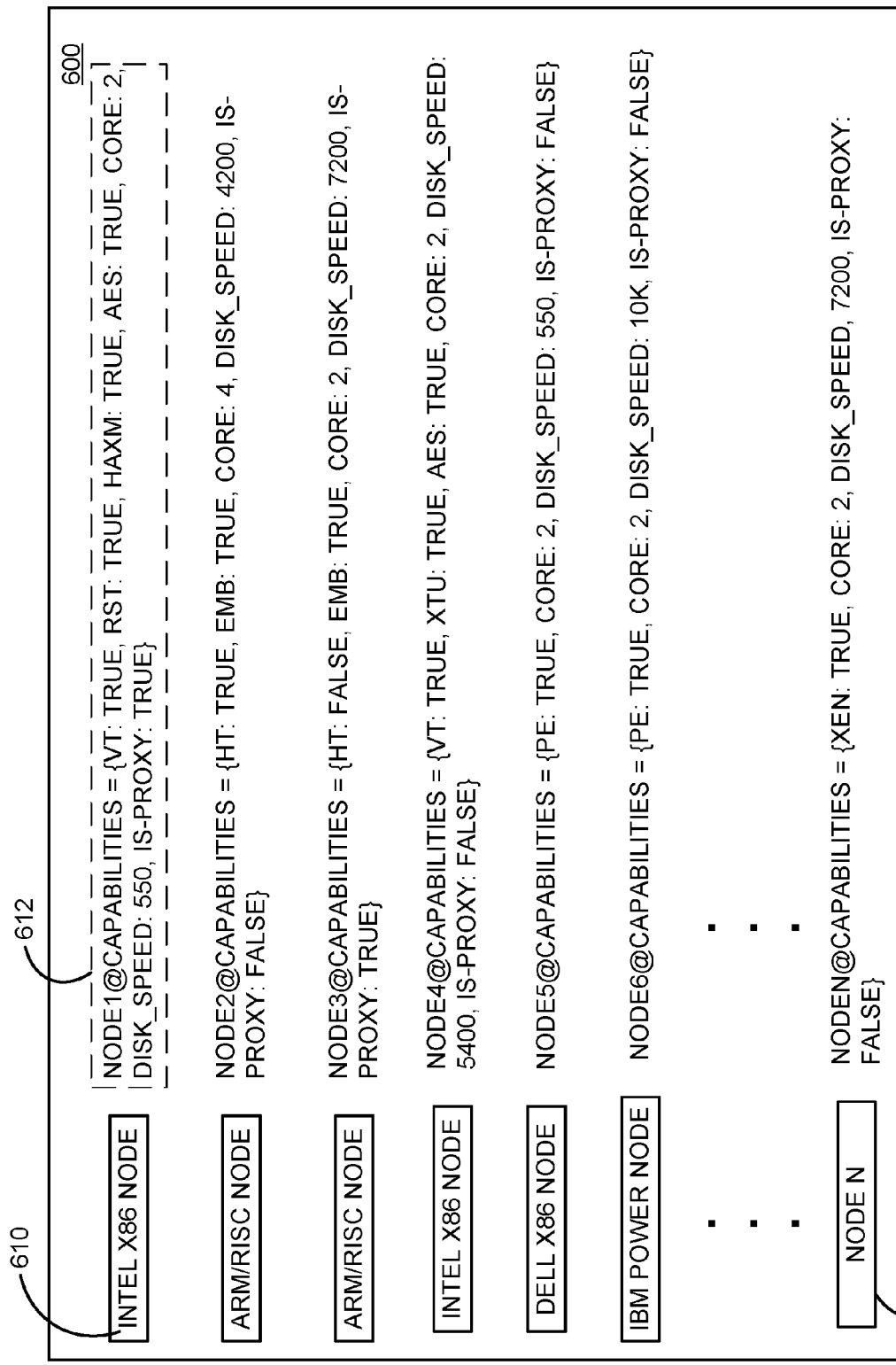
FIG. 6 depicts a table containing characteristics of hardware, according to various embodiments.

FIG. 6 depicts a table 600 containing characteristics of hardware, according to various embodiments.

The proposed framework, according to various embodiments, facilitates a daemon on each node participating in an object storage cluster and the daemon may collect various hardware features or accelerators built in the nodes and disk rotational speeds etc., and may export the collected details from each node to storlet scheduler middleware. The storlet engine may then identify the underlying hardware features along with the role served by a node (e.g., proxy or storage) using the middleware.

The proposed middleware may enable a hook in a storlet engine execution cycle and may facilitate a provision to automatically determine the category of computation operation deployed by the user. It may also support manual determination of category of the computation operation by a user (but may also include an automatic learning platform).

An example of category classification of deployed computation operation by a storlet engine middleware may include: (Encrypt an object)→Encryption category; (.TXT to .PDF conversation)→File system/Direct Memory category; and (Seismic data processing)→Arithmetic category, according to various embodiments.

The storlet engine may keep track of various hardware characteristics and/or parameters, including hardware features, disk speeds, role of the node, etc. and the deployed computation operation category. The storlet engine may then determine the appropriate hardware architecture node to be selected for processing the deployed computation operation, based on the characteristics and/or parameters, along with the available resource consideration. The storlet engine may also perform a comparison of the determined computation operation category versus best matched hardware features which are pre-programmed and inputted to the storlet engine as a template, according to various embodiments.

At 610 is shown an example Intel x86 node, with various characteristics shown at 612, including number of cores, disk speed, and whether node 610 is a proxy. A 614 is shown an example Node N, as the table 600 may contain a plurality of nodes and accompanying characteristics.

Figure 7:
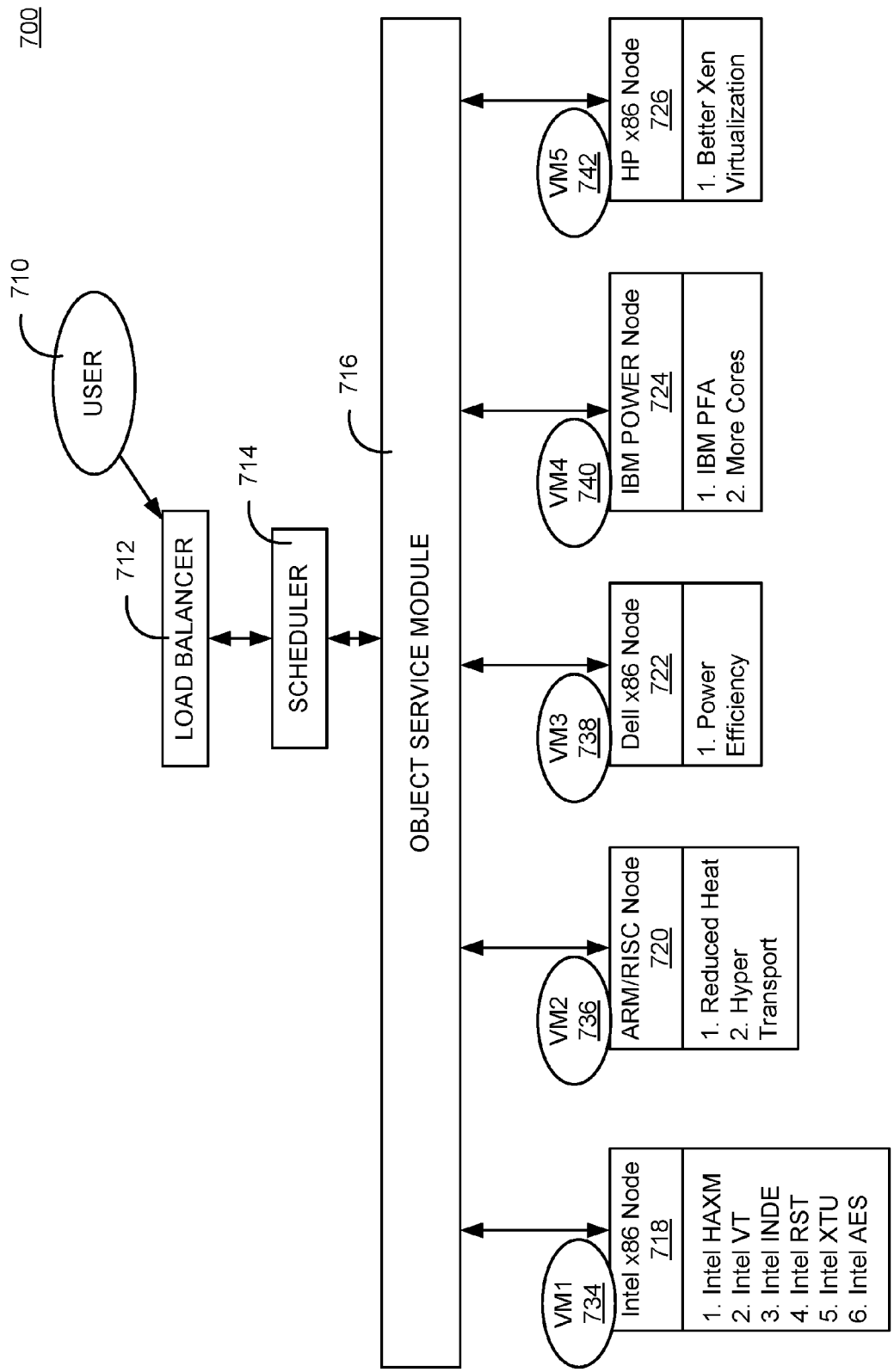
FIG. 7 depicts a block diagram for assigning virtual machines to nodes based on hardware characteristics, according to various embodiments.

FIG. 7 depicts a block diagram 700 for assigning virtual machines to nodes based on hardware characteristics, according to various embodiments.

For example, if multi-vendor and/or commodity hardware is to be utilized, along with sample hardware value additions, plugged in to an object storage unit, the hardware may be inefficient.

At 712 is a load balancer with which a user 710 may communicate or the user 710 may configure. The load balancer may communicate with a scheduler module 714. The scheduler module 714 may communicate with an object service module 716. The object service module may control various nodes and/or VMs and may assign data or work to be computed. The object service module may be in communication with various nodes, including an Intel x86 node 718, and ARM/RISC node 720, a Dell x86 node 722, an IBM Power node 724, and an HP x86 node 726. The nodes may include various features based on the hardware characteristics of each node or node-hosting hardware, as is described herein. Various VMs may be assigned to various nodes using the object service module 716, including VM1 734 to the Intel x86 node 718, VM2 736 to the ARM/RISC node 720, VM3 738 to the Dell x86 node 722, VM4 740 to the IBM Power node 724, and VM5 742 to the HP x86 node 726. The VMs, and workloads associated therewith, may be assigned using the object service module, through which the load balancer 712 and the scheduler 714 may interact, to nodes and/or hardware as is appropriate and efficient, under various conditions, and according to various hardware characteristics, as described herein. A template may also be utilized to assign nodes and operations to appropriate nodes.

A user may input data to an object storage interface, including a username and password, according to various embodiments. A computation operation may then be uploaded to a storlet engine. The storlet engine may then trigger a container or VM to execute the computation operation on a node. The node may be selected as being where most of the data required for this computation operation is located, or the node may be selected as having the most available resources. A node may then be selected that contains characteristics that allow for acceleration of execution for the computation operation, which may result in faster processing of, for example, an encryption workload. Usage of a storage unit may also be reduced as a result.

The present disclosure describes various methods and systems for the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for adjusting roles of nodes in a distributed clustered file system, comprising:
receiving a first computation operation;
profiling the first computation operation by parsing the first computation operation into a plurality of arithmetic sub-operations, and analyzing the plurality of arithmetic sub-operations;
determining, based on the profiling of the first computation operation, a first file system attribute associated with the first computation operation;
identifying, in response to determining the first file system attribute, that the first computation operation requires a node serving a first file system role by performing a lookup operation based on a first computation operation template, wherein the first computation operation template identifies respective file system roles required by respective computation operations; and
wherein the first computation operation template further identifies respective hardware characteristics required for a node serving respective file system roles including a respective hardware role, a respective number of processing cores, a respective hard disk speed, a respective thermal characteristic, a respective hardware efficiency, a respective hyper-transport status, and a respective proxy status;
wherein each node of the plurality of nodes operate as a storage node or a proxy node other than having hardware characteristics for serving a file system role;
identifying a first hardware characteristic of hardware on which a first node of a plurality of nodes is hosted, wherein the identifying a first hardware characteristic comprises:
retrieving by a respective daemon of each respective node, at respective scan intervals, respective hardware characteristics from respective nodes of the plurality of nodes, wherein respective hardware characteristics comprise hardware role, number of processing cores, hard disk speed, thermal characteristics, hardware efficiency, hyper-transport status, and proxy status and exporting the retrieved hardware characteristics to a memory in response to identifying the first file system role; and
identifying respective nodes including the first node of the plurality of nodes having respective hardware characteristics required for respective file system roles based on the retrieved respective hardware characteristics stored in the memory;
receiving an identification that the first node has capability and can utilize additional computation of the first file system role;
instantiating a virtualization unit on the first node, wherein the first node is selected based on the first file system attribute and the first hardware characteristics, and wherein the virtualization unit serves the first file system role that can utilize the additional computation of the virtualization unit; and performing the first computation operation on the virtualization unit instantiated on the first node.

2. The method of claim 1, wherein the first file system attribute is selected from a group consisting of node type, features, file system roles, computation operation categories, and tasks by served the first node.

3. The method of claim 1, further comprising:
receiving a second computation operation;
profiling the second computation operation according to one or more metrics,
determining, based on the profiling of the second computation operation, a second file system attribute associated with the second computation operation.

4. The method of claim 1, wherein the determining the first file system attribute is based on past performance.

5. The method of claim 1, wherein the first file system attribute indicates a file system role required by the first computation operation.

6. A system for adjusting roles of nodes in a distributed clustered file system, comprising:
a processor coupled to a system memory, wherein the processor is configured to:
receive a first computation operation;
profile the first computation operation by parsing the first computation operation into a plurality of arithmetic sub-operations, and analyzing the plurality of arithmetic sub-operations;
determine, based on the profiling of the first computation operation, a first file system attribute associated with the first computation operation;
identify, in response to determining the first file system attribute, that the first computation operation requires a node serving a first file system role by performing a lookup operation based on a first computation operation template, wherein the first computation operation template identifies respective file system roles required by respective computation operations; and
wherein the first computation operation template further identifies respective hardware characteristics required for a node serving respective file system roles including a respective hardware role, a respective number of processing cores, a respective hard disk speed, a respective thermal characteristic, a respective hardware efficiency, a respective hyper-transport status, and a respective proxy status;
identify a first hardware characteristics of hardware on which a first node of a plurality of nodes is hosted, wherein the identify a first hardware characteristic comprises:
retrieving by a respective daemon of each respective node, at respective scan intervals, respective hardware characteristics from respective nodes of the plurality of nodes, wherein respective hardware characteristics comprise hardware role, number of processing cores, hard disk speed, thermal characteristics, hardware efficiency, hyper-transport status, and proxy status and exporting the retrieved hardware characteristics to a memory in response to identifying the first file system role; and
identifying respective nodes including the first node of the plurality of nodes having respective hardware characteristics required for respective file system roles based on the retrieved respective hardware characteristics stored in the memory;

receive an identification that the first node has capability and can utilize additional computation of the first file system role;
instantiate a virtualization unit on the first node, wherein the first node is selected based on the first file system attribute and the first hardware characteristics, and wherein the virtualization unit serves the first file system role that can utilize the additional computation of the virtualization unit; and
perform the first computation operation on the virtualization unit instantiated on the first node.

7. The system of claim 6, wherein the first computation operation template is configurable by a user.

8. The system of claim 6, wherein the processor is further configured to:
receive a second computation operation;
profile the second computation operation according to one or more metrics,
determine, based on the profiling of the second computation operation, a second file system attribute associated with the second computation operation.

9. The system of claim 6, wherein the first file system attribute indicates a file system role required by the first computation operation.

10. A computer-readable program product for adjusting roles of nodes in a distributed clustered file system, the computer program product comprising a computer readable storage medium having program instructions embodied therewith, the program instructions executable by a computer to cause the computer to perform a method comprising:
receiving a first computation operation;
profiling the first computation operation by parsing the first computation operation into a plurality of arithmetic sub-operations, and analyzing the plurality of arithmetic sub-operations;
determining, based on the profiling of the first computation operation, a first file system attribute associated with the first computation operation;
identifying, in response to determining the first file system attribute, that the first computation operation requires a node serving a first file system role by performing a lookup operation based on a first computation operation template, wherein the first computation operation template identifies respective file system roles required by respective computation operations; and
wherein the first computation operation template further identifies respective hardware characteristics required for a node serving respective file system roles including a respective hardware role, a respective number of processing cores, a respective hard disk speed, a respective thermal characteristic, a respective hardware efficiency, a respective hyper-transport status, and a respective proxy status;
wherein each node of the plurality of nodes operate as a storage node or a proxy node other than having hardware characteristics for serving a file system role;
identifying a first hardware characteristic of hardware on which a first node of a plurality of nodes is hosted, wherein the identifying a first hardware characteristic comprises:
retrieving by a respective daemon of each respective node, at respective scan intervals, respective hardware characteristics from respective nodes of the plurality of nodes, wherein respective hardware characteristics comprise hardware role, number of processing cores, hard disk speed, thermal characteristics, hardware efficiency, hyper-transport status, and proxy status and exporting the retrieved hardware characteristics to a memory in response to identifying the first file system role; and identifying respective nodes including the first node of the plurality of nodes having respective hardware characteristics required for respective file system roles based on the retrieved respective hardware characteristics stored in the memory;

receiving an identification that the first node has capability and can utilize additional computation of the first file system role;

instantiating a virtualization unit on the first node, wherein the first node is selected based on the first file system attribute and the first hardware characteristics, and wherein the virtualization unit serves the first file system role that can utilize the additional computation of the virtualization unit; and performing the first computation operation on the virtualization unit instantiated on the first node.

11. The computer-readable program product of claim 10, wherein the first file system attribute is selected from a group consisting of node type, features, file system roles, computation operation categories, and tasks by served the first node.

12. The computer-readable program product of claim 10, wherein the method further comprises:
receiving a second computation operation;
profiling the second computation operation according to one or more metrics,
determining, based on the profiling of the second computation operation, a second file system attribute associated with the second computation operation.

13. The computer-readable program product of claim 10, wherein the determining the first file system attribute is based on metadata of the first computation operation.

14. The computer-readable program product of claim 10, wherein the first file system attribute indicates a file system role required by the first computation operation.

\* \* \* \* \*